(12) United States Patent
Lomerson, Jr. et al.

(10) Patent No.: US 8,864,200 B2
(45) Date of Patent: *Oct. 21, 2014

(54) END EFFECTOR WITH INTERNAL VALVE

(75) Inventors: Roland Lomerson, Jr., Lakewood Ranch, FL (US); Michael W. Norton, Richmond, VA (US)

(73) Assignee: AMF Automation Technologies, LLC, Richmond, VA (US)

( * ) Notice: Subject to any disclaimer, the term of this patent is extended or adjusted under 35 U.S.C. 154(b) by 199 days.

This patent is subject to a terminal disclaimer.

(21) Appl. No.: 13/595,308

(22) Filed: Aug. 27, 2012

(65) Prior Publication Data
US 2013/0082474 A1 Apr. 4, 2013

Related U.S. Application Data

(63) Continuation-in-part of application No. 12/763,242, filed on Apr. 20, 2010, now Pat. No. 8,251,415, and a continuation-in-part of application No. 13/287,184, filed on Nov. 2, 2011.

(51) Int. Cl.
*B66C 1/02* (2006.01)
*B25J 15/06* (2006.01)

(52) U.S. Cl.
CPC ............ *B25J 15/0633* (2013.01); *Y10S 901/40* (2013.01)
USPC .............................. 294/186; 294/189; 901/40

(58) Field of Classification Search
USPC ....................... 294/183–186, 189, 65; 901/40
See application file for complete search history.

(56) References Cited

U.S. PATENT DOCUMENTS

| | | | | |
|---|---|---|---|---|
| 3,558,171 | A | * | 1/1971 | Netsch et al. .................. 294/186 |
| 4,078,671 | A | * | 3/1978 | Lundstrom .................... 414/627 |
| 4,787,812 | A | * | 11/1988 | Gopfert .......................... 414/737 |
| 5,088,878 | A | | 2/1992 | Focke et al. |
| 5,609,377 | A | | 3/1997 | Tanaka |
| 7,000,964 | B1 | * | 2/2006 | Porras et al. ................... 294/186 |
| 7,017,961 | B1 | | 3/2006 | Parnell et al. |
| 7,648,182 | B2 | | 1/2010 | Salimkhan |
| 7,950,708 | B2 | | 5/2011 | Parnell |
| 8,251,415 | B2 | * | 8/2012 | Lomerson, Jr. .................... 294/2 |
| 2009/0206619 | A1 | | 8/2009 | Schmidt et al. |
| 2010/0040450 | A1 | | 2/2010 | Parnell |
| 2011/0254298 | A1 | | 10/2011 | Lomerson, Jr. |

OTHER PUBLICATIONS

M-420iA/M-421iA, Fanuc Robotico Brochure 2007, 10 pages.

* cited by examiner

*Primary Examiner* — Paul T Chin
(74) *Attorney, Agent, or Firm* — Thomas/Horstemeyer, LLP

(57) ABSTRACT

A bellows 10 is configured for connection to an end effector of a robot and includes a valve 28 supported in the interior space of the bellows. A flow of low pressure air is induced from inside the bellows into a vacuum plenum 24 for retrieving a work product by the open end 16 of the bellows. High pressure air is moved through a conduit 50 into the valve to terminate the flow of low pressure air and terminate the suction applied by the bellows to the work product.

20 Claims, 5 Drawing Sheets

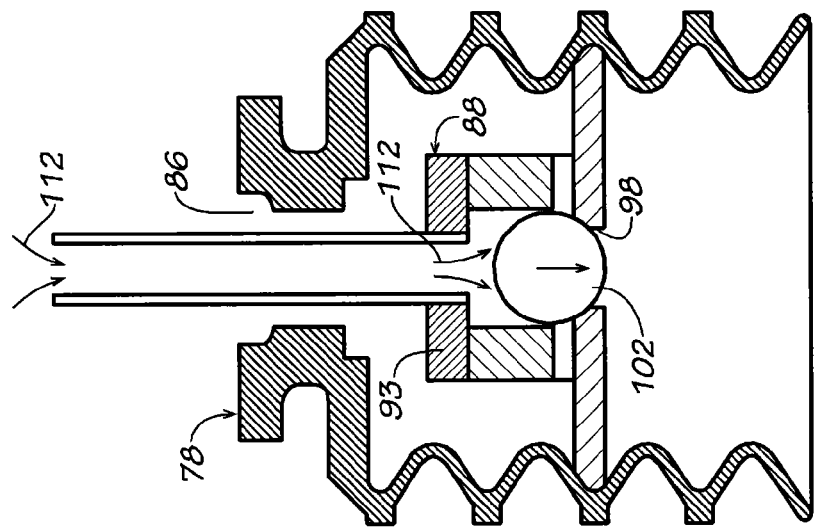
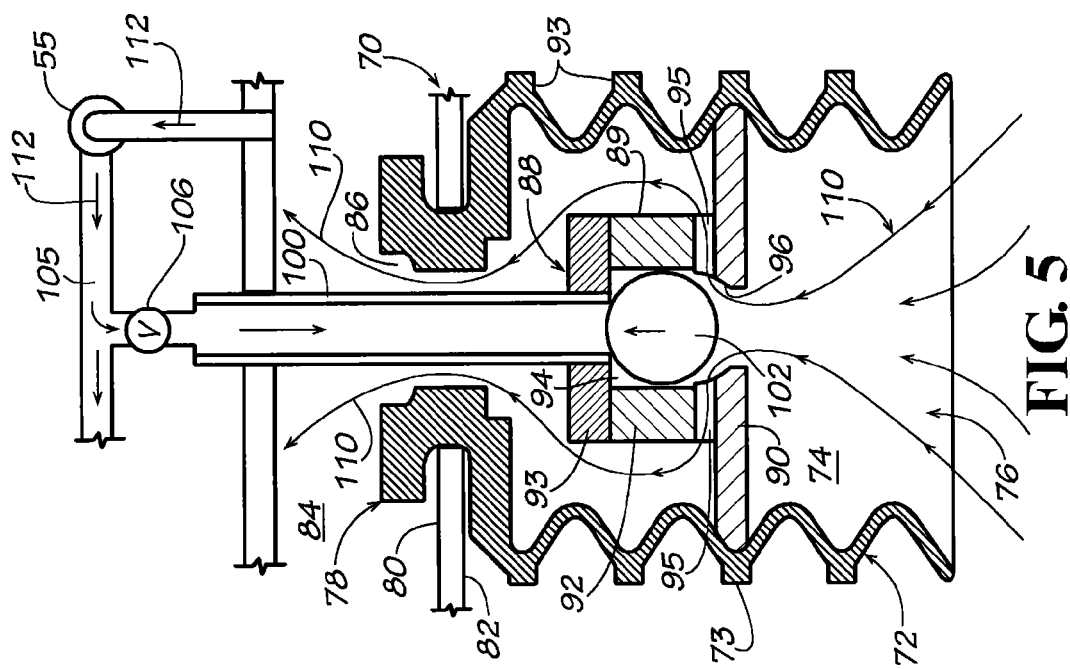

END EFFECTOR WITH INTERNAL VALVE

CROSS REFERENCE

This is a continuation-in-part of U.S. patent application Ser. No. 12/763,242 filed in the U.S. Patent & Trademark Office on Apr. 20, 2010, now U.S. Pat. No. 8,251,415, issued Aug. 28, 2012, and a continuation-in-part of U.S. patent application Ser. No. 13/287,184 filed in the U.S. Patent & Trademark Office on Nov. 2, 2011.

FIELD OF THE INVENTION

This disclosure concerns robotic packaging devices that include an end effector that can be used for collecting work products of different shapes and sizes, usually for placing the products in different patterns into a receptacle, such as a shipping container.

BACKGROUND OF THE DISCLOSURE

When placing work products in a shipping container, it is desirable to place several work products at a time in the container and, in some instances, the work products must be collected in a desired pattern of the products for fitting into the container of a specific size and shape.

For example, in the bakery industry a producer typically will produce several sizes of loaves of bread and has one type of shipping container in which the products are to be packed and shipped. Because different ones of the products may be different in size and shape from time to time, the products may fit best in the shipping container when the products are configured in different arrangements, or "pack patterns," than other sized products. The pack patterns may be dependent upon the product sizes.

A robot may be used to pick the products up with multiple picks of the end effector at various positions of the end effector to form the desired pack pattern for the particular shipping container. The robot then places the products into the shipping container all at once, in the desired pattern.

The end effector that is used to pick and place products typically will use multiple suction cups that are used as vacuum retrievers to provide the seal between the vacuum source and the objects being picked. When multiple picks are required for one delivery of the products to the shipping container, the vacuum must be applied to certain ones of the suction cups on the end effector to enable picking or holding the product in that pick zone while the other zones of the suction surface must not allow vacuum flow because those zones of the end effector are not yet covered by work products. To accomplish this, the vacuum source may be applied in several suction cups, and the suction cups are then applied to the work product. The suction cups that are not in communication with the vacuum source cannot pick the work products in that picking zone.

It is desirable to have the end effector in a compact, low profile and to employ the smallest number of components necessary for the end effector to achieve its functions.

Usually, a single vacuum source is applied to the end effector, and the end effector controls the application of the sub-atmospheric pressure to the suction cups.

Additional information concerning end effectors for robots may be found in U.S. Pat. No. 7,950,708. The disclosure in said patent concerning programmable zoned end effectors is adopted herein in its entirety by reference.

End effectors having vacuum charged suction cups may be used to pick and place work products that have loose outer coverings, such as loaves of sliced bread in a plastic bag, so that when the vacuum of a suction cup is applied to the work product, it tends to lift the plastic bag and the plastic bag, in turn, lifts the product inside the plastic bag. This generally tends to separate the upper portion of the plastic bag from the work product, causing a portion of the plastic bag to be lifted up to the interior of the suction cup. This is not desirable in that it sometimes stretches the plastic bags and may even rupture the plastic bags while the work product is attached to the end effector. Also, the shreds of plastic and film that are separated from the plastic bags during the application of the vacuum to the bags tends to move into the suction cup, through the air flow system, including the valves, the low pressure air plenum, etc., requiring these and other components of the equipment to be cleaned so as to maintain the function and durability of the component parts of the system.

SUMMARY OF THE DESCRIPTION

Briefly described, one form of the technology described herein is an end effector for mounting to a robotic arm and for engaging and transporting a work product. The end effector may include multiple suction cups such as cylindrical bellows or other type suction cups. The suction cups may each include a side wall defining an interior space, a mounting end for mounting to and communicating with a plenum chamber, and an open end for facing the atmosphere and for engaging and retrieving the work products. An air control valve is positioned in the interior space of each bellows. Each air control valve may include a valve housing with a bottom wall facing the open end of the bellows, a side wall connected to the bottom wall, and a top wall for connection to the mounting end of the bellows. The bottom wall, side wall and top wall define a valve chamber, and the valve chamber defines at least one valve air inlet opening. A valve element for each valve inlet opening is positioned in the valve chamber for registration with the valve inlet openings for blocking movement of air from the interior space of the bellows into the valve chamber.

The valve elements may be ball valves. The bottom wall of the valve housing may be impervious to the movement of air from the interior space of the bellows into the valve chamber. The bottom wall may form a ceiling to the interior space of the bellows so that the plastic bag or other flexible container for the work product may bear against the bottom wall, thereby avoiding overly stretching the plastic bag.

If the suction cup is a bellows, the open end of the bellows may be sized so as to retract to a predetermined distance displaced from the valve such that the work products engaged and transported by the bellows likely will not engage the valve. However, the bottom surface of the valve housing may be impervious to the passage of air so that in the event that the plastic wrapper of the work product is stretched upwardly into the interior space of the bellows, it will engage only the impervious surface of the valve housing and will avoid blocking the air passages of the bellows.

The top wall of the valve housing may define a low pressure air outlet opening for communication with air at a pressure lower than atmospheric air, and defines a high pressure air inlet opening for communication with air pressure higher than atmospheric air. These two air pressures are used to manipulate the valve balls, ultimately opening and closing the valve openings.

Another form of the bellows includes a valve positioned in the support end of the bellows, with the valve including a support plate positioned between the support end and the open end of the bellows and defining an air passage, and a valve element supported by the support plate for opening and closing the air passage. The air passage may extend through the support plate and the valve element may be mounted to the support plate at the support end of the bellows.

Another form of the invention is a bellows configured for connection to an end effector of a robot. The bellows may include a corrugated circular side wall defining an interior space, an open end for engaging a work product, and a mounting end opposite to said open end for mounting to a vacuum plenum. The mounting end of the bellows defines a low pressure air outlet opening for exhausting air from said interior space into the vacuum plenum and for drawing a work product into contact with said open end of said bellows, and a high pressure air supply conduit extends through the low pressure outlet opening for supplying high pressure air into the interior space of the bellows for disengaging the work product from contact with the open end of said bellows.

The bellows also include a valve positioned in and supported by the bellows for controlling the flows of low pressure air and high pressure air through the open end of said bellows. The valve may comprise a ball valve, a leaf valve, and a valve action formed by the flows of alternate high and low pressures of air through the bellows.

Another form of the invention is an end effector for mounting to a robotic arm for engaging and transporting a work product, including a plurality of bellows supported by the end effector, each said bellows including a side wall defining an interior space, an open end for engaging a work product, and a mounting end opposite to the open end for communication with a vacuum plenum, and a valve positioned in the interior space of each of the bellows, the valves each including a support plate positioned between the support end and the open end of the bellows and defining an air passage for the movement of low air pressure there through, and a valve element supported by the support plate for opening and closing the air passage in response to high air pressure applied to the valve element.

Another form of the invention may be the valve element being suspended beneath the support plate and movable parallel to the support plate into and out of alignment with the air passage.

Another feature of the invention may be the valve includes a valve housing suspended beneath said support plate, the valve housing including a side wall with a laterally facing air passage defined in the side wall, and the valve element is a ball valve movable laterally into and out of registration with the laterally facing side wall. The valve element may be positioned above and in alignment with the air passage and movable in response to the movement of air through the air passage to close the air passage. The valve may be a leaf valve.

Other objects, features, and advantages of this disclosure will become apparent upon reviewing the following specification and drawings, and as described in more detail in the accompanying claims.

BRIEF DESCRIPTION OF THE DRAWINGS

FIG. 5 is a side cross sectional view of another form of the invention, including valve housing positioned in the mounting end of the bellow on a support plate, with a vertically movable valve element moved upwardly by the rush of the inlet air stream to open the vacuum air passage.

FIG. 6 is a side cross sectional view of the bellow, similar to FIG. 5, but showing the vertically movable valve element moved down into blocking relationship with the air passage in response to high pressure air applied to the upper surface of the valve element.

DETAILED DESCRIPTION

Figure 1:
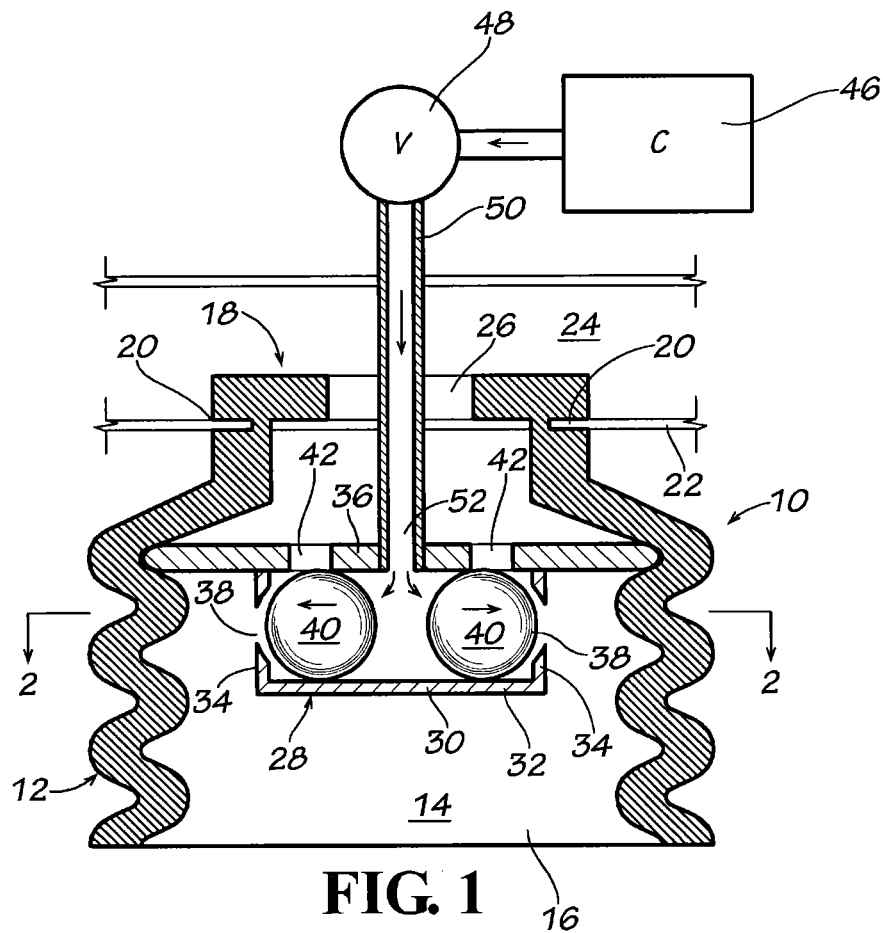
FIG. 1 is a side cross sectional view of one of the bellows of an end effector, showing the valve positioned below the support plate in its closed position.
Figure 2:
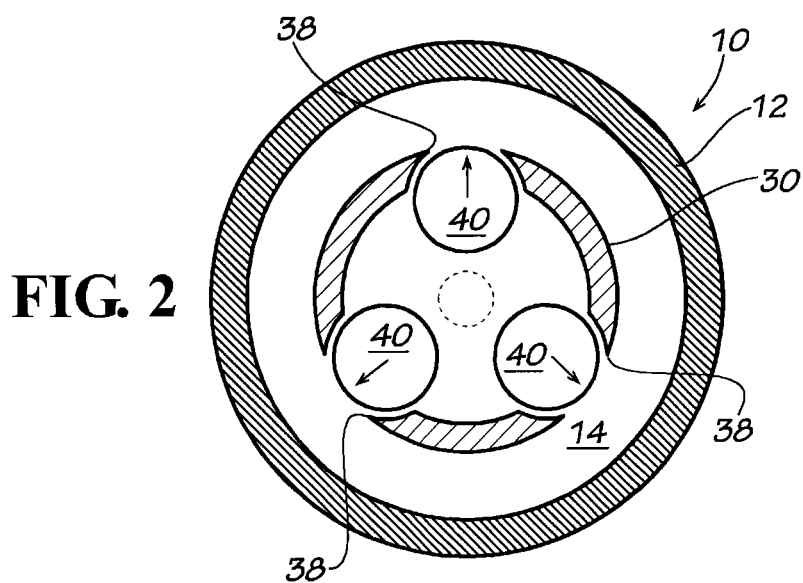
FIG. 2 is a plan view in cross section, taken along lines 2-2 of FIG. 1.

Referring now in more detail to the drawings, in which like numerals indicate like parts throughout the views, FIG. 1 illustrates a bellows 10 and includes a circular side wall 12 that is formed in a series of vertically spaced circular ribs. The side wall of the bellows defines an interior space 14, having an open end 16 for engaging work products and a mounting end 18 opposite to said open end for mounting to the vacuum plenum 24.

The mounting end 18 of the bellows includes a circular outwardly facing groove 20 that is mounted about a circular opening in the panel 22 of a vacuum plenum 24. A low air pressure outlet opening 26 is formed in the mounting end 18 of the bellows. It allows the interior space 14 of the bellows to communicate with the vacuum air in the vacuum plenum 24.

A valve 28 is positioned in the interior space 14 of the bellows 10. Valve 28 includes a valve housing 30 that has a bottom wall 32, a circular side wall 34, and a top wall 36. At least one, preferably three vacuum air inlet openings 38 are formed in the circular side wall 34, typically at 120° intervals about the circular side wall so that the air inlet openings are equally spaced about the circular side wall 34.

Top wall 36 of valve housing 30 may be of a larger diameter than bottom wall 32 and its perimeter reaches radially outwardly into engagement with the interior surface of the side wall 12 of bellows 10. The protrusion of the top wall into the outwardly extending recess of the bellows side wall tends to hold the valve housing 30 in its position as illustrated in FIG. 1.

Valve housing 30 includes valve elements 40 which are spherically shaped and which rest freely on the upwardly facing surface of the bottom wall 32 of valve housing 30.

Top wall 36 of valve housing 30 defines vacuum air outlet openings 42 that extend between the interior of valve housing 30 and the space above the top wall 36 of the valve housing 30.

A source of high air pressure 46, such as a compressor and a high air pressure plenum (not shown), communicate through a valve 48 for each bellows, then through conduit 50 that extends through the vacuum plenum 24, to a central high air pressure opening 52 in the top wall 36 of valve housing 30. The source of high air pressure 46 may originate from a high pressure plenum (not shown) or other conventional means. Likewise, the conduits and valves 48 for each bellows are of conventional construction and available in various forms.

FIG. 1 shows the bellows with its valve 28 in its inoperative condition, with air pressure higher than atmospheric air pressure moving through conduit 50 downwardly through the mounting end 18 of the bellows 10 into the interior of valve housing 30, as illustrated by the downwardly extending arrows in FIG. 1. The high pressure imposed in the interior of the valve housing 30 urges the valve elements 40 radially outwardly toward registration with the lower pressure of the air inlet openings 38, as shown by the arrows in FIG. 1, and into alignment with the air outlet openings 42 in the top wall 36 of the valve housing 30. This places the valve elements 40 of valve housing 30 in substantially closed relationships with both the vacuum air inlet openings 38 and the vacuum air outlet openings 42.

When in this condition, the bellows becomes dormant since there is very little vacuum in communication with the interior space 14 of the bellows.

Preferably, the valve elements 40 will not make a complete seal of the high pressure air inlet openings 38 so that a small air leakage around the valve elements 40 and outwardly through the air inlet openings will be established. Likewise, the valve elements 40 will only partially block air outlet openings 42 in the top wall 36, also maintaining a small stream of high pressure air upwardly through the air outlet openings 42. This continuous flow of air tends to assure that the valve housing 30, its openings 38 and 42, and the valve elements will become "self-cleaning," removing debris that might otherwise accumulate in such a valve.

Figure 3:
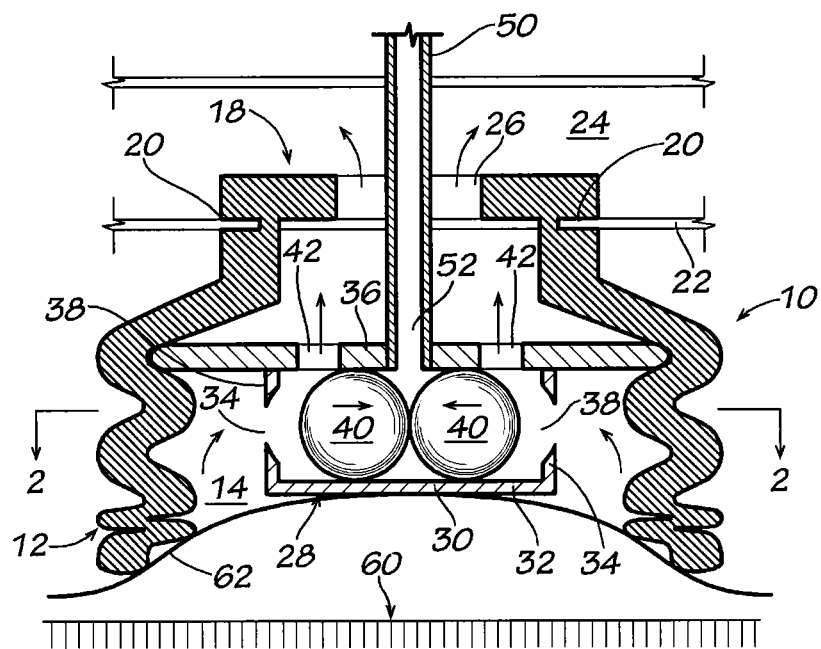
FIG. 3 is a side cross sectional view of the bellows of FIG. 1, but showing its valve in the open position.
Figure 4:
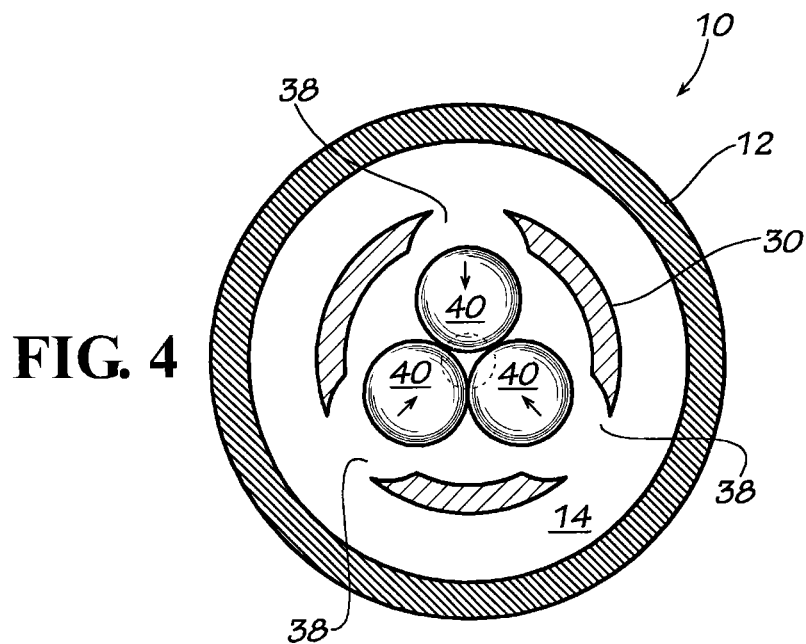
FIG. 4 is a plan view in cross section, taken along lines 4-4 of FIG. 3.

FIGS. 3 and 4 show the bellows in its active condition, whereby the low pressure air in the vacuum plenum 24 draws air from the atmosphere upwardly through the bellows 10. This happens when the valve 48 (FIG. 1) closes so as to terminate the flow of high pressure air from its source 46. The continuous exposure of the bellows to the vacuum plenum 24 through low air pressure outlet opening 26 reverses the positions of the valve elements 40, as shown by the arrows in FIG. 3. The continuous inducement of air flow by the vacuum plenum 24 tends to evacuate air from the interior space 14 of the bellows, with the air flowing through the air inlet openings 38 of the circular side wall 34, then upwardly through the air outlet openings 42 in top wall 36, and finally through the low air pressure outlet opening 26 of the mounting end 18 of the bellows.

It will be noted from FIGS. 3 and 4 that the valve elements 40 tend to be drawn toward each other, toward the center of the valve housing 30, thereby moving out from beneath the air outlet openings 42 of the top wall 36. This opens the passages of air from the interior space 14 of the bellows 10, upwardly into the vacuum plenum 24.

FIG. 3 also illustrates the work product 60 below the valve 28 that includes a wrapper 62. For example, the work product may be a loaf of bread 60 and the wrapper 62 may be the flexible plastic sheet material that contains the work product. It will be noted that the low air pressure in the interior space 14 of the bellows tends to lift the wrapper 62 away from the work product 60. In most cases, this will not be a significant removal of the wrapper from the work product. However, in some instances where the wrapper is loosely applied to the work product, the wrapper may be sucked upwardly inside the bellows to the point that it becomes engaged with the downwardly facing surface of the bottom wall 32 of the valve housing 30. Since the bottom wall 32 is impervious to the movement of air therethrough, the wrapper 62 tends to engage the bottom wall 32 and move no farther in a vertical direction. This tends to limit the "pull" of the wrapper away from the work product 60.

Since air inlet openings 38 in the side wall 34 face laterally away from the work product 60 and its wrapper 62, it is unlikely that the wrapper 62 would reach the air inlet openings 38 of the valve housing 30, thereby avoiding blockage of the air inlet openings 38.

FIG. 1 illustrates how the flow of air pressure tends to function as a cleaning means for removing debris from the valve housing, etc. It will be noted that in FIG. 3 a similar flushing of air through the valve housing 30 is present when the valve elements 40 have been moved away from the openings 38 and 42 of the valve housing.

FIG. 5 illustrates a bellows 70 and includes a circular side wall 72 that is formed in a series of vertically spaced circular ribs 73. The side wall of the bellows defines an interior space 74, having an open end 76 for engaging work products and a mounting end 78 opposite to the open end for mounting to a vacuum plenum 84.

The mounting end 78 at the upper portion of the bellows includes a circular outwardly facing groove 80 that is mounted about an opening in the panel 82 of the vacuum plenum 84. A low air pressure outlet opening 86 is formed in the mounting end 78 of the bellows and communicates with the vacuum plenum 84. The low air pressure outlet opening 86 allows the interior space 74 of the bellows to communicate with the low pressure vacuum air in the vacuum plenum 84.

A valve 88 is positioned in the interior space 74 of the bellows 70. Valve support plate 90 supports the valve housing 88. The valve support plate 90 has a perimeter that corresponds in size and shape to the interior surface of an outwardly extending circular protrusion of a circular rib 73 of the bellows 70, and an air passage opening 91 extends through the central portion of the valve support plate. The valve 88 includes a valve housing 89 that is mounted to the upper surface of the valve support plate 90, inside the mounting end 78 of the bellows.

Valve housing 89 is positioned over the air passage opening 91 and includes an upwardly extending side wall 92 that extends about the air passage opening 91 and a top wall 93 that extends over the side wall 92 and defines a valve chamber 94 positioned about the air passage opening 91. A valve element, such as a spherical valve ball 102 is positioned in the valve chamber 94. Air exhaust ports 95 are formed in the side wall 92 at a level lower than the center of the spherical valve ball, so that air can be moved, as shown by the arrows 110 in FIG. 5, through the open end 76 of the bellows 70, through the air passage opening 91 of the valve support plate 90, and through the air exhaust ports 95 of the valve housing 88, into the mounting end 68 of the bellows 70, up through the low air pressure outlet opening 86 of the mounting end 78 of the bellows, and into the vacuum plenum 84. This applies an air pressure that is lower than atmospheric air pressure to the lower open end 76 of the bellows 70 so the bellows may engage and lift a work product such as, but not limited to, a loaf of bread.

A high pressure air supply conduit 100 extends downwardly from a high pressure air supply source 105. The high pressure air supply source may comprise a blower 106 that draws air from the vacuum plenum 84 and, as shown by arrows 112 of FIG. 6, moves air at a higher pressure through a high pressure air control valve 106 to the high pressure air supply conduit 100. The high pressure air supply conduit 100 extends through low air pressure outlet opening 86 at the mounting end 78 of the bellows 70, through the top wall 93 of the valve housing 89 and into the valve housing 89 and applies air at a pressure sufficient to move the valve ball 102 toward closed relationship with respect to the air passage opening 91 of the valve support plate 90. This reduces the movement of low pressure air upwardly through the air passage opening 91, and the lower air pressure in the open end of the bellows is not sufficient to retrieve work products.

The shape of the valve ball 102 or the shape of the valve seat 96 are formed so as to allow leakage between them to apply some movement of high pressure air down through the air passage opening for discharging debris from the valve and to assure that air pressure being applied to the work product is reduced.

Figure 7:
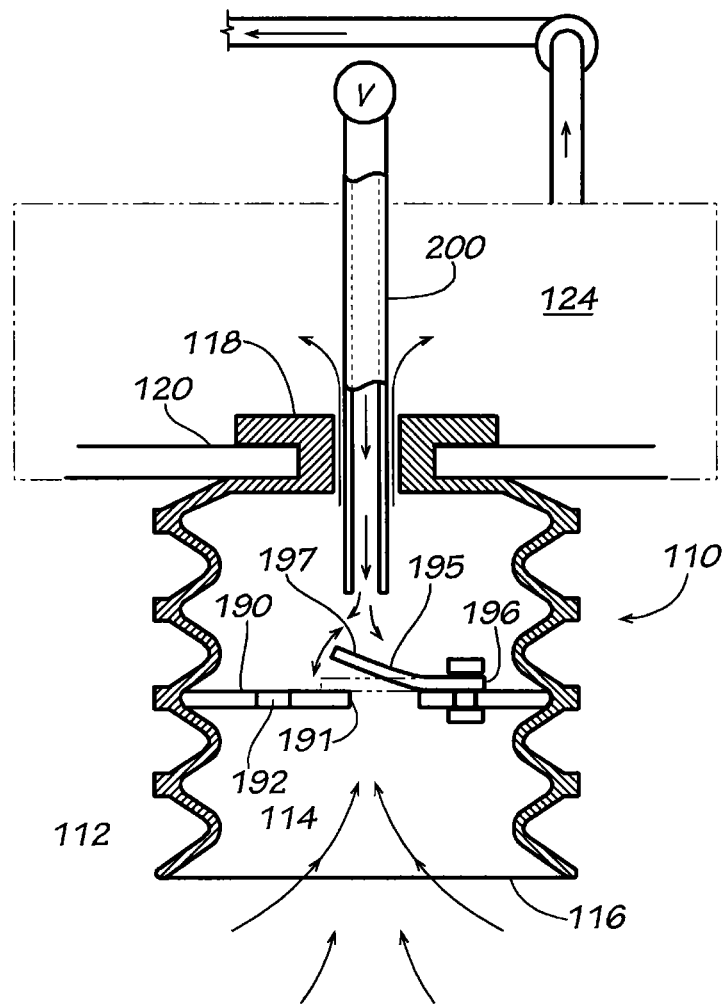
FIG. 7 is a side cross sectional view of another form of the invention, including a support plate mounted in a bellow and a leaf valve that is movable between open and closed relationship with respect to the air passage through the support plate.

FIG. 7 shows a bellows 110 that includes a circular, ribbed side wall 112 that defines a an interior space 114 also having and open end 116 and a mounting end 118, and a circular groove 120 for mounting to a vacuum plenum 124.

Valve support plate 190 has a perimeter that corresponds in size and shape to the interior surface of an outwardly extending circular protrusion of a circular rib of the bellows, and an air passage opening 191 extends through the central portion of the valve support plate. Leaf valve 195 is positioned in the mounting end of the bellows and is attached at its proximal end 196 to the valve support plate and its distal end 197 is positioned over the air passage opening 191 and is free to move toward and away from a closed position over the air passage opening.

When the supply of high pressure air through high pressure air supply conduit 200 is terminated, the reduced air pressure applied by the vacuum plenum 124 draws air up through the air passage opening 191 and the pressure differential through the air passage opening is sufficient to move the distal end of the leaf valve away from the air passage opening and a flow of reduced air pressure is induced through the open end of the bellows and into the vacuum plenum 124.

When the supply of high pressure air through the high pressure air supply conduit 200 is established, the high air pressure pushes the distal end 197 of the leaf valve 195 toward its closed position over the air passage opening 191, terminating the flow of air upwardly through the air passage opening. This increases the air pressure in the open end 116 of the bellows, causing the bellows to release the work product.

The leaf valve or the valve support plate 190 may be formed with an air opening, such as air opening 192 so as to allow a small flow of high pressure air into the open end 116 of the bellows for raising the air pressure in the open end of the bellows and discharging the work product from the bellows.

Figure 8:
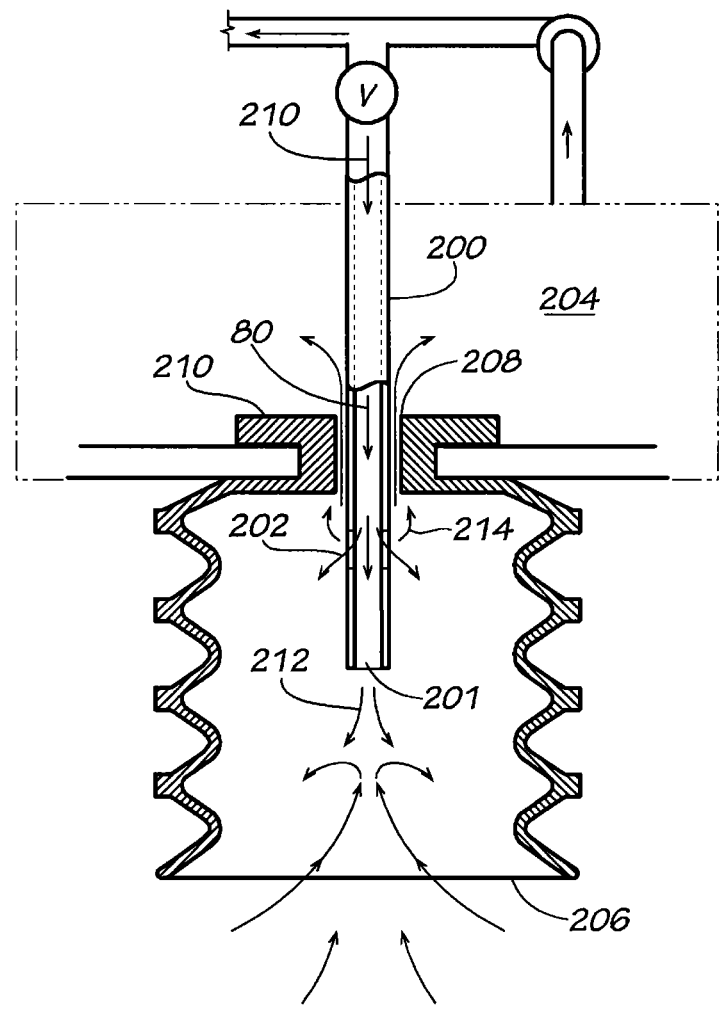
FIG. 8 is a side cross sectional view of another form of the invention, including a bellow, a support plate mounted in the bellow and an air supply and discharge conduit directed to the open end of the bellow for controlling the air movement through the bellow.

FIG. 8 shows a bellows 198 that is similar to the bellows described in the preceding figures. But the valve used in the bellows of FIG. 8 is a high air pressure applicator.

The high pressure air supply conduit 200 terminates in an open end 201 in the open end of the bellows, and side openings 202 may be formed along the length of the conduit 200.

The application of reduced air pressure is similar to those as described above, in that a vacuum plenum 204 draws air from the bellows, from the open end 206 through the low air pressure outlet opening 208 at the mounting end 210 of the bellows. This causes the open end of the bellows to attach to the work product.

When the work product is to be released, high pressure air is moved from a source as previously described through a valve V downwardly through the high pressure air supply conduit 200, as illustrated by the arrows 212 and 214, into the open end of the bellows. When the valve V is opened the high pressure air moves into the open end of the bellows, releasing the work product from the bellows.

The side openings 202 of the high pressure air supply conduit 200 function to fill the upper portion of the open end of the bellows with higher air pressure, and the opening 201 at the lower end of the high pressure air supply conduit is directed toward the lower end of the bellows to provide a stream of high pressure air toward the work product attached to the bellows, to direct a stream of air directly toward the work product to enhance the removal of the work product from the bellows.

The expressions "high" and "low" air pressures are intended to mean air pressures that are higher than and lower than atmospheric air pressure, respectively.

Although a preferred embodiment of the invention has been disclosed as a bellows, it should be understood that the invention may comprise other types of suction cups and that the term "bellows" is to be construed as including flexible suction cups. It will be obvious to those skilled in the art that variations and modifications of the disclosed embodiment can be made without departing from the spirit and scope of the invention as set forth in the following claims.

The invention claimed is:

1. An end effector for mounting to a robotic arm for engaging and transporting a work product, comprising
a plurality of bellows supported by said end effector, each said bellows including a side wall defining an interior space, an open end for engaging a work product, and a mounting end opposite to said open end for communication with a vacuum plenum,
a valve positioned in said interior space of each of said bellows,
said valve including a support plate positioned between said support end and said open end of said bellows and defining an air passage for the movement of low air pressure there through from said open end toward said mounting end of said bellows, and a valve element supported by said support plate for opening and closing said air passage in response to movement of high air pressure from said mounting end of said bellows applied to said valve element.

2. The end effector of claim 1, wherein said valve element is suspended beneath said support plate and is movable parallel to said support plate into and out of alignment with said air passage.

3. The end effector of claim 2, wherein said valve includes a valve housing suspended beneath said support plate, said valve housing including a side wall with a laterally facing air passage defined in said side wall, and said valve element is a ball valve movable laterally into and out of registration with said laterally facing side wall.

4. The end effector of claim 3, wherein said bottom wall of said valve housing is displaced from said open end of said bellows a distance such that the open end of said bellows cannot contract to the level of said bottom wall of the valve housing during operation of said bellows.

5. The end effector of claim 1, wherein said valve element is positioned above and in alignment with said air passage and is movable in response to the movement of air through said air passage to close said air passage.

6. The end effector of claim 1, wherein said valve element is a leaf valve.

7. The end effector of claim 1, wherein said valve comprises a valve housing mounted in registration with said air passage,
said valve housing defining at least one air inlet opening,
said valve element positioned in said valve housing for said air inlet opening and configured for blocking movement of air from said open end of said bellows through said air passage and into said valve chamber.

8. The end effector of claim 1, wherein said at least one valve opening comprises a plurality of valve openings, and said at least one valve element comprises a valve element for each said valve opening.

9. The end effector of claim 1, wherein said valve element is an air pressure activated valve.

10. The end effector of claim 1, wherein said valve element is selected from a ball valve and a leaf valve.

11. The end effector of claim 1, wherein said valve housing defines a low pressure air outlet opening for communication with air at a pressure lower than atmospheric air, and defines a high pressure air inlet opening for communication with air at a pressure higher than atmospheric air.

12. The end effector of claim 8, wherein said valve chamber is configured for moving said at least one valve element toward said valve opening in response to high pressure air entering said valve housing through said high pressure air inlet opening.

13. The end effector of claim 11, and further including a vacuum plenum in communication with said low pressure outlet opening for drawing air from said interior space of said bellows.

14. A bellows configured for connection to an end effector of a robot,
said bellows comprising a corrugated circular side wall defining an interior space, an open end for engaging a work product, and a mounting end opposite to said open end for mounting to a vacuum plenum,
said mounting end of said bellows defining a low pressure air outlet opening for exhausting air from said interior space into the vacuum plenum and for drawing a work product into contact with said open end of said bellows,
a high pressure air supply conduit extending through said low pressure outlet opening for supplying high pressure air into said interior space of said bellows for disengaging the work product from contact with said open end of said bellows.

15. The bellows of claim 14, and further including
a valve positioned in and supported by said bellows for controlling the flow of low pressure air and high pressure air through said open end of said bellows wherein said valve comprises a leaf valve.

16. The bellows of claim 14, wherein said valve comprises a ball valve.

17. The bellows of claim 14, wherein said valve comprises said high air pressure conduit extending through said mounting end of said bellows for applying high pressure air toward the work product engaged by said open end of said bellows.

18. A bellows configured for connection to an end effector of a robot,
said bellows comprising a corrugated circular side wall defining an interior space, an open end for engaging a work product, and a mounting end opposite to said open end for mounting to a vacuum plenum,
a valve positioned in said interior space of each of said bellows, said valve including a valve housing defining a valve chamber,
at least one laterally facing air inlet opening formed in said valve housing between said interior space of said bellows and said valve chamber for admitting air from said interior space of said bellows into said valve chamber, and at least one upwardly facing air outlet opening formed in said valve housing for exhausting air out of said valve housing to the vacuum plenum, and
a valve element for each laterally facing air inlet opening movable in said valve chamber to simultaneously block both said at least one laterally facing air inlet opening and said at least one upwardly facing air outlet opening.

19. The end effector of claim 18, wherein said valve housing further includes an upwardly facing air inlet opening for passing gas at a higher pressure than atmospheric air pressure into said valve housing for moving said at least one valve element to simultaneously block both said at least one laterally facing air inlet opening and said at least one upwardly facing air outlet opening.

20. The end effector of claim 19, wherein said at least one laterally facing air inlet opening comprises a plurality of air inlet openings.

* * * * *